United States Patent
Shen et al.

(10) Patent No.: US 6,434,748 B1
(45) Date of Patent: *Aug. 13, 2002

(54) METHOD AND APPARATUS FOR PROVIDING VCR-LIKE "TRICK MODE" FUNCTIONS FOR VIEWING DISTRIBUTED VIDEO DATA

(75) Inventors: Paul Shen; Edward A Krause, both of San Diego; Adam S. Tom, La Jolla, all of CA (US)

(73) Assignee: Imedia Corporation, San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/803,952

(22) Filed: Feb. 25, 1997

Related U.S. Application Data

(63) Continuation of application No. 08/363,375, filed on Dec. 23, 1994, now abandoned.

(51) Int. Cl.[7] .............................................. H04N 7/173
(52) U.S. Cl. ........................................ 725/89; 725/100
(58) Field of Search .............................. 348/7, 6, 8, 10, 348/13; 386/1, 45, 46, 68, 82, 125, 126; 725/89, 100, 134, 142

(56) References Cited

U.S. PATENT DOCUMENTS

| | | | |
|---|---|---|---|
| 4,343,042 A | 8/1982 | Schrock et al. | 455/5 |
| 4,521,806 A | 6/1985 | Abraham | 358/86 |
| 4,567,512 A | 1/1986 | Abraham | 358/86 |
| 4,590,516 A | 5/1986 | Abraham | 386/86 |
| 4,616,263 A | 10/1986 | Eichelberger | 358/185 |
| 4,829,372 A | 5/1989 | McCalley et al. | 358/86 |
| 4,862,268 A | 8/1989 | Campbell et al. | 358/141 |
| 4,901,367 A | 2/1990 | Nicholson | 455/5 |
| 4,949,187 A | 8/1990 | Cohen | 358/335 |

(List continued on next page.)

FOREIGN PATENT DOCUMENTS

| | | | |
|---|---|---|---|
| EP | 0 527 632 A2 | 2/1993 | H04N/7/08 |
| EP | 0 279 549 B1 | 12/1993 | H04N/5/262 |
| EP | 0 605 115 A2 | 12/1993 | |
| EP | 0 594 350 A1 | 4/1994 | H04N/7/173 |
| EP | 0 633 694 A1 | 1/1995 | H04N/7/173 |
| GB | 0103438 | 3/1984 | H04N/7/10 |
| JP | 3-68288 A | 3/1991 | H04N/5/78 |
| WO | WO 91/03112 | 3/1991 | H04H/1/00 |
| WO | WO 92/11713 | 7/1992 | H04H/1/02 |
| WO | 9305593 | 3/1993 | H04H/1/02 |
| WO | WO 94/10775 | 5/1994 | H05K/1/02 |

OTHER PUBLICATIONS

Sincoskie, W.D., System Architecture for a Large Scale Video on Demand Service, Computer Networks and ISDN Systems 22, pp. 155–162, 1991.*

(List continued on next page.)

*Primary Examiner*—Young Lee
(74) *Attorney, Agent, or Firm*—McCutchen, Doyle, Brown & Enersen, LLP; David G. Beck

(57) ABSTRACT

An apparatus for providing VCR-like "trick mode" functions, such as pause, fast-forward, and rewind, in a distributed, video-on-demand program environment. Trick modes are supported by locally altering the viewing speed for each user who requests such functions, without affecting the operation of the central data source in any way. Thus, a virtual unlimited number of viewers are able to enjoy random access to video programming, including virtually continuous trick mode functionality. This is accomplished in a manner that is operable with existing telephone and cable distribution infrastructure.

20 Claims, 12 Drawing Sheets

U.S. PATENT DOCUMENTS

| | | | |
|---|---|---|---|
| 4,963,995 A | 10/1990 | Lang | 358/335 |
| 4,975,771 A | 12/1990 | Kassatly | 358/146 |
| 5,014,125 A | 5/1991 | Pocock et al. | 358/86 |
| 5,051,822 A | 9/1991 | Rhoades | 358/86 |
| 5,115,309 A | 5/1992 | Hang | 358/13 |
| 5,119,188 A | 6/1992 | McCalley et al. | 358/86 |
| 5,130,792 A | 7/1992 | Tindell et al. | 358/85 |
| 5,168,353 A | 12/1992 | Walker et al. | 358/86 |
| 5,191,410 A | 3/1993 | McCalley et al. | 358/86 |
| 5,216,503 A | 6/1993 | Paik et al. | 358/133 |
| 5,220,420 A | 6/1993 | Hoarty et al. | 358/86 |
| 5,231,486 A | 7/1993 | Acampora et al. | 358/133 |
| 5,243,629 A | 9/1993 | Wei | 375/59 |
| 5,253,341 A | 10/1993 | Rozmanith et al. | 395/200 |
| 5,267,334 A | 11/1993 | Normille et al. | 382/56 |
| 5,305,113 A | 4/1994 | Iwamura et al. | 358/312 |
| 5,309,450 A | 5/1994 | Kim | 371/39.1 |
| 5,315,584 A | 5/1994 | Savary et al. | 370/18 |
| 5,319,457 A | 6/1994 | Nakahashi et al. | 348/387 |
| 5,371,532 A | 12/1994 | Gelman et al. | 348/7 |
| 5,377,051 A | 12/1994 | Lane et al. | 360/33.1 |
| 5,398,143 A | 3/1995 | Strolle et al. | 360/48 |
| 5,414,455 A * | 5/1995 | Hooper et al. | 348/7 |
| 5,421,031 A | 5/1995 | De Bey | 455/5.1 |
| 5,438,423 A | 8/1995 | Lynch et al. | 358/335 |
| 5,442,390 A | 8/1995 | Hooper et al. | 348/7 |
| 5,487,035 A | 1/1996 | Nishimura et al. | 365/189.02 |
| 5,546,118 A | 8/1996 | Ido | 348/7 |
| 5,594,491 A | 1/1997 | Hodge et al. | 378/7 |
| 5,612,742 A | 3/1997 | Krause et al. | 348/385 |
| 5,630,104 A * | 5/1997 | Ottesen et al. | 395/500 |
| 5,682,597 A | 10/1997 | Ganek et al. | 455/4.2 |
| 5,721,823 A | 2/1998 | Chen et al. | 395/200.33 |

OTHER PUBLICATIONS

O'Shea, Dan, "Bell Atlantic rides ADSL into video future," *Telephony*, pp. 60–62, Nov. 1, 1993.*

Gelman, A.D., Kobrinski, H., Smoot, L.S., and Weinstein, S.B. (1991). "A Store–And–Forward Architecture for Video–On–Demand Service." International Conference on Communications, Jun. 23–26, 1991, vol. 2 of 3., pp. 0842–0846.

Kupfer, Andrew, "Any Movie, Anytime," *Fortune*, Jan. 25, 1993, p. 83.

"Digital HDTV Recorders—The Next Best Thing to Being There," *Popular Science*, Apr. 1993, p. 61.

Karpinski, Richard, "Bell Atlantic Patents ADSL Video–on–Demand," *Telephony*, Nov. 1, 1993, p. 7.

Soviero, Marcelle M., "R & D—Ready for Digital VCRs," *Popular Science*, Dec. 1993, p. 38.

Wayner, Peter, "State of the Art—Digital Video Goes Real–Time," *Byte*, Jan. 1994, pp. 107–112.

* cited by examiner

TIME = t1+T/2

METHOD AND APPARATUS FOR PROVIDING VCR-LIKE "TRICK MODE" FUNCTIONS FOR VIEWING DISTRIBUTED VIDEO DATA

This application is a Continuation of application Ser. No. 08/363,375, filed on Dec. 23, 1994 now abandoned.

FIELD OF THE INVENTION

The present invention relates to providing video programming on demand, and more particularly to methods and apparatus for providing VCR-like "trick mode" functions, such as pause, fast-forward, and rewind, in a distributed, video-on-demand program environment.

RELATED APPLICATION UNDER 35 U.S.C. § 120

The present invention is a continuation-in-part of co-pending U.S. application Ser. No. 08/326,511, filed Oct. 19, 1994, and entitled METHOD AND APPARATUS FOR ENCODING AND FORMATTING DATA REPRESENTING A VIDEO PROGRAM TO PROVIDE MULTIPLE OVERLAPPING PRESENTATIONS OF THE VIDEO PROGRAM (the "Parent Application"), the priority of which is hereby claimed pursuant to 35 U.S.C. § 120, and the entirety of which is incorporated herein by this reference.

BACKGROUND OF THE INVENTION

People in the United States spend roughly $7.5 billion annually to rent movies and other pre-recorded video programming for private playback at their convenience. Such video programming can be rented in many forms, such as video cassette tapes for playback using a video cassette recorder (VCR), video disks for playback on video disk players, or as CD ROM's for playback using personal computers and other forms of CD ROM players. Renting video programming in this manner is desirable, among other reasons, because it permits a user to view any portion of the video program at any desired speed and in any direction. For example, a user may view some portion of the program, then "pause" the program for a desired interruption (i.e., set the viewing speed to zero), and then view the remainder of the program after the interruption. Further, a user may change viewing speed for a desired segment of the program to slow-motion or fast-forward; or, users may rewind backward through the program, effectively making the viewing speed negative. Functions such as these, for altering the speed of viewing, are referred to herein as "trick mode" viewing functions. Because VCR's support these trick mode functions, users are advantageously freed from the linear, time-based constraints of traditional network and cable television programming.

Cable television and direct broadcast satellite (DBS) companies would like to compete in this arena by providing users with the same freedom of use enjoyed through video rental. This service would be known as "video-on-demand." Such companies would clearly enjoy an advantage over video rental establishments in providing such a service because users would not be required to leave the comfort of their own homes to rent a copy of the video program (nor would they have to return it when finished). These companies have been heretofore constrained, however, by existing playback and distribution technology.

It would be prohibitively expensive for a cable television company to provide true video-on-demand using currently known technology. To duplicate the advantages of video rental and in-home playback, the company would have to provide a dedicated playback resource to each cable subscriber, along with an expensive memory array containing a library of video programs from which the subscriber could select programs for playback through the dedicated resource. Further, the cable distribution infrastructure would be required to have sufficient bandwidth to distribute a different video program, or at least a different playback of a video program, to each subscriber connected to the network. Of course this would be difficult without a leap in technology and replacement of the current distribution infrastructure.

One possible compromise would be to produce multiple, overlapping playback (i.e. presentations) of the same video program, such that a new presentation of the program would begin, for example, every five minutes. For a two hour video program, a total of twenty-four overlapping presentations of the program would be made available to subscribers. Each subscriber would then have a receiver capable of selectively receiving any one of the twenty-four presentations. Although a subscriber would not enjoy full video-on-demand, the subscriber would have to wait at most five minutes to begin viewing the program in its entirety. The Parent Application provides a detailed description of inventive technology for implementing this approach.

A limitation of this approach, as disclosed and described in the Parent Application, is that although subscribers are able to access any desired point within a program by accessing a different one of the overlapping presentations, a subscriber must wait as much as five minutes (i.e., the length of an interval) for the overlapping presentation to "catch up" to the desired point being accessed. Therefore, without additional enhancement, the approach of the Parent Application does not enable subscribers to enjoy "trick mode" functions such as pause, fast forward, and rewind in the virtually continuous form that VCR users have come to expect.

Complex disk-drive arrays or video servers have been recently proposed, each having thousands of video programs stored in their memory and each capable of serving up to two hundred subscribers. The cost of implementing a video-on-demand system for the 57 million current cable subscribers, assuming that such advanced technology could be implemented, would still require an estimated $20 billion in capital investments (about $350.00 per subscriber). Further, full implementation of a service based on such proposed server technology would require that the current cable and telephone distribution network infrastructure be restructured and upgraded over the next several years at a cost of an additional two billion dollars per year to increase its bandwidth. Implementing VCR-like trick mode functions would not only increase the complexity of the servers, but it would also impinge on available bandwidth because each subscriber must be able to communicate commands back to his or her dedicated server. Such "back channels" are not even available in the context of existing DBS systems, and most existing cable distribution systems.

To date, cable television and DBS companies have offered pay-per-view services that permits users to request (either over the telephone or directly through the cable network) an offered video program for a fee. The company then permits the subscriber to receive the selected transmission of the video program. These services are far from video-on-demand, however, and among other limitations do not provide subscribers the freedom associated with the trick mode functionality of in-home playback resources such as a VCR.

Accordingly, there is a need for new technology that can provide a virtually unlimited number of viewers with virtually random access to video programming—including virtually continuous trick mode functionality—in a manner that is operable with existing telephone and cable distribution infrastructure.

SUMMARY OF THE INVENTION

The present invention discloses methods and apparatus for providing VCR-like "trick mode" functions, such as pause, fast-forward, and rewind, in a distributed, video-on-demand program environment. Trick modes are supported by locally altering the viewing speed for each user who requests such functions, without affecting the operation of the central data source in any way. The invention thus allows a virtually unlimited number of viewers to enjoy random access to video programming—including virtually continuous trick mode functionality—and does so in a manner that is operable with existing telephone and cable distribution infrastructure.

These and other objects of are satisfied by a novel method and apparatus for use with distributed program data transmitted to the user from a central data source. A portion of the program data received is written to the user's local storage medium. Program data for a desired program is read from the local storage medium and then displayed for the user, generally at a normal viewing speed. When a particular user requests an altered speed (i.e., a trick mode), such as zero (i.e., pause), a negative.speed (i.e., rewind), a speed greater than normal speed (i.e., fast forward), or a speed that is a fraction of normal speed (i.e., slow motion), program data is read from the local storage medium and then displayed for that user at the desired, altered speed. Other users can read and view the video data at normal speed, or a different altered speed.

This method and apparatus are preferably supported by repeatedly transmitting multiple copies of the program data from the central data source along multiple, component data streams at predetermined intervals. Over time, program data from specific component streams is selected for storage to the local storage medium, as needed to support requested trick mode functions and in accordance with the preferred rules disclosed herein. In another feature of the invention, each one of a plurality of write pointers is associated with a different one of the component data streams; the write pointers specify what program data should be written into the local storage medium over time.

In yet another preferred aspect of the invention, a table for addressing the program data stored on the local storage medium is provided, and program data is read from the local storage medium in random access fashion. As will be described herein in detail, the local storage medium and the address translation table are preferably organized in circular fashion.

DETAILED DESCRIPTION OF THE INVENTION

Overall Architecture

Figure 1:
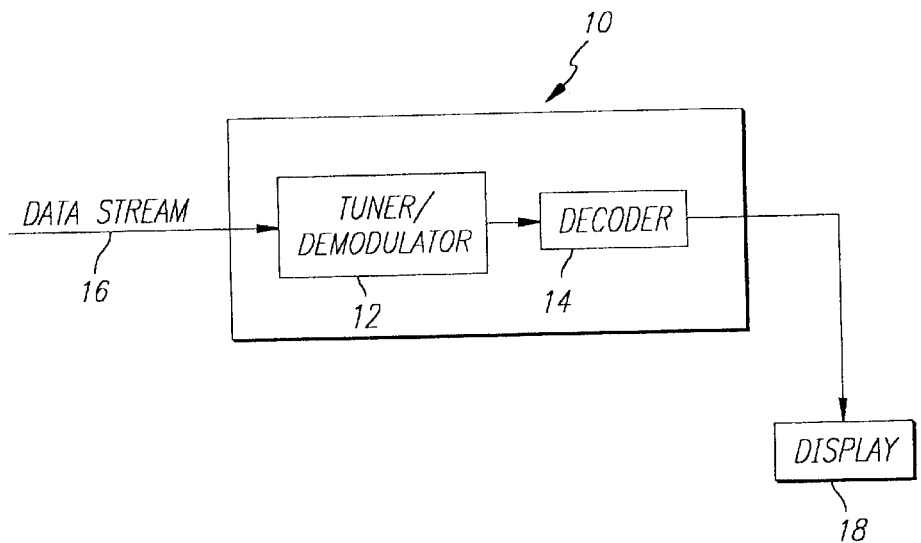
FIG. 1 illustrates a prior art, "set-top" box architecture for cable delivery of video programming.

FIG. 1 illustrates a representative, prior art, "set-top" box architecture for cable delivery of video programming. Set-top box 10 is so named because it is a physically separate box that is coupled to a subscriber's television set (here shown as display unit 18), and that serves to process incoming video programming data as will now briefly be described. In such systems, video programming is delivered over cable lines in the form of electrical signals, represented here by data stream 16. In conventional systems, data stream 16 generally comprises analogue data, although advances in technology have lead to the wide spread assumption that data stream 16 will soon include digital data. In any event, data stream 16 is fed into set-top box 10, wherein the desired program channel of data stream 16 is selected and demodulated by tuner/demodulator 12, and decoded (and/or decrypted) by decoder 14. Set-top box 10 then outputs a suitable video signal for display unit 18, enabling the subscriber to view his or her desired programming channel. If data stream 16 consists of digitally encoded video data, decoder 14 will preferably include logic for decompressing digital data that has been compressed using schemes such as MPEG or DigiCipher.

Figure 2A:
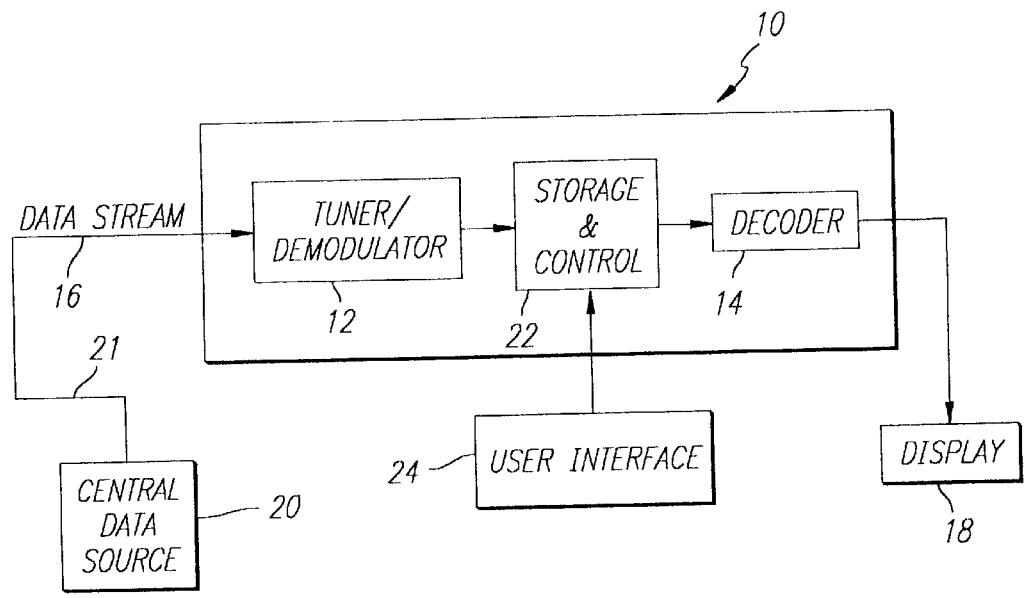
FIG. 2a illustrates an "integrated" architecture for the present invention.

FIG. 2a illustrates one possible, high level architecture for the present invention. We will refer herein to this architecture as the integrated approach, because hardware embodying the present invention is integrated within set-top box 10 according to this approach. In particular, as shown in FIG. 2a, storage and control block 22 is placed within set-top box 10, and may be interposed between tuner/demodulator 12 and decoder 14. Storage and control block 22 contains hardware or software logic implementing the functions of the present invention, as will be described at length below. User interface 24, which may be in the nature of a hand-held remote control device, is provided as a means by which a subscriber can selectively issue commands for trick mode functions such as pause, fast-forward, etc. Storage and control block 22 carries out such trick mode commands in accordance with the present invention, as described at length further below.

Figure 2B:
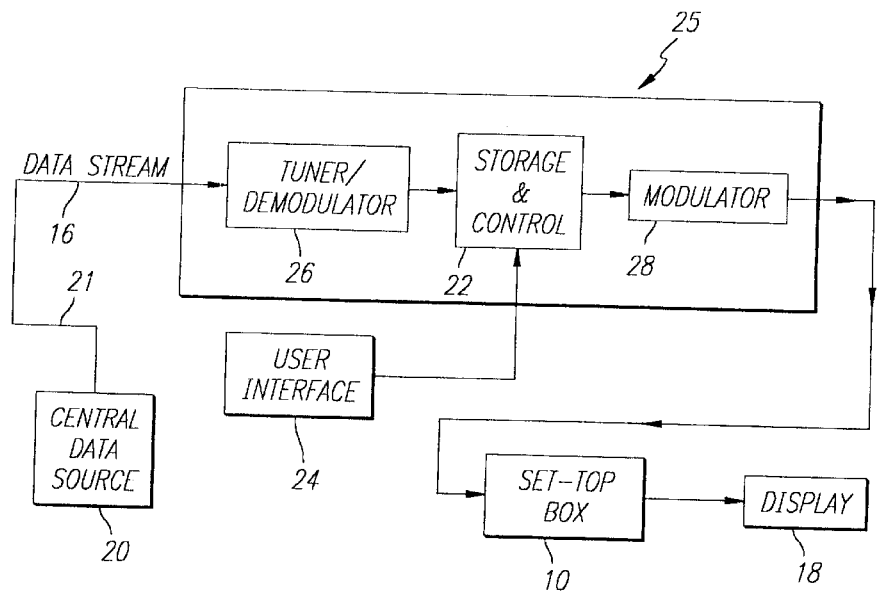
FIG. 2b illustrates a "separate box" architecture for the present invention.

FIG. 2b illustrates an alternative, high level architecture for the present invention. This architecture may be referred to as the separate box approach, because it assumes the coupling of physically separate box 25 to existing set-top box 10. As shown in FIG. 2b, data stream 16 is first processed within separate box 25 by tuner/demodulator unit 26. The data is the processed by storage and control box 22, which is responsible for providing the trick mode functionality of the present invention responsive to requests from user interface 24. The data is then modulated to a preassigned channel (e.g., channel 3) by modulator unit 28, and is then passed on from separate box 25 to traditional set-top box 10 where it is thereafter processed in a conventional manner.

As shown in both FIGS. 2a and 2b, data stream 16 is transmitted to users from central data source 20. Central data source 20 is the centralized source of the program data viewed by all users; as just one example, central data source 20 may comprise a system of file servers or the like. Data stream 16 is preferably transmitted from central data source 20 and distributed to users via transmission means 21, which may comprise communications conduits such as satellite links, cable television lines, telephone lines, power lines, or any other conduits suitable for distributing program data.

Figure 3:
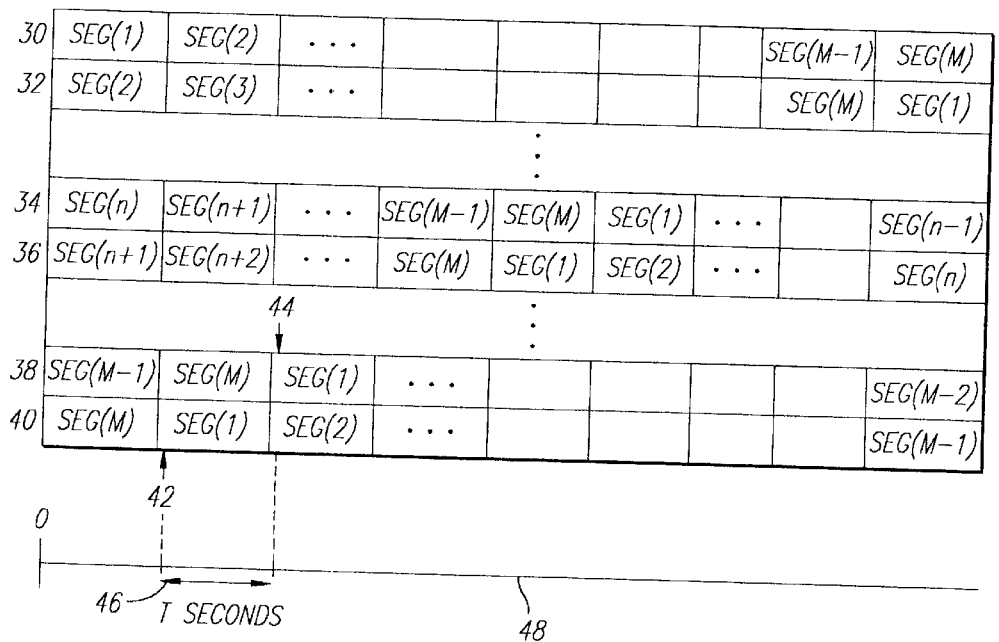
FIG. 3 summarizes a preferred data interleaving technique for encoding video program data in accordance with the present invention.

For purposes of a preferred embodiment of the present invention, data stream 16 contains digital video programming data, encoded in accordance with an interleaving technique such as previously described in the Parent Application. Readers should refer to the Parent Application for a detailed description of the preferred data interleaving technique, but FIG. 3 summarizes a few of the essential points for present purposes. Data stream 16 preferably comprises multiple data streams, such as streams 30–40 in FIG. 3. These component streams 30–40 are transmitted over time, as indicated by time-line 48. Each component stream preferably contains the entire video program of interest, and is divided over time into sequential segments, with each segment preferably representing just the next few minutes of the entire program. Assuming that a particular video program is L seconds in length, and the length of a segment is T seconds, then each component stream will contain L/T=M distinct segments of video data. Preferably, M streams are transmitted. Although the M streams all contain copies of the same video program, the streams are transmitted in an interleaved manner over time as shown in FIG. 3, such that at the same moment in time when video data corresponding to segment n of the video program is being transmitted as part of stream 34, segment n+1 of the video program is simultaneously being transmitted as part of stream 36. Because a total of M streams are being transmitted, information from all M segments of the entire video program is being transmitted at all times.

It follows that every T seconds, the complete video program is retransmitted in its entirety. For example, as shown in the figure, point 42 within segment 1 of the program is transmitted as part of component stream 40 at a particular moment in time, and exactly T seconds later the very same data will be transmitted within component stream 38, as indicated by range 46 on time-line 48. As explained at length in the Parent Application, this interleaving technique enables video on demand on functionality, essentially by insuring that every point within the video program is always no more than T seconds away from being transmitted. For example, a subscriber can begin viewing the video program from the beginning and in its entirety starting virtually any time he or she feels like it. At most, the subscriber must wait up to T seconds for the beginning of segment 1 of the video program (or any other desired point within the video program) to be transmitted along one of the M component data streams.

Figure 4:
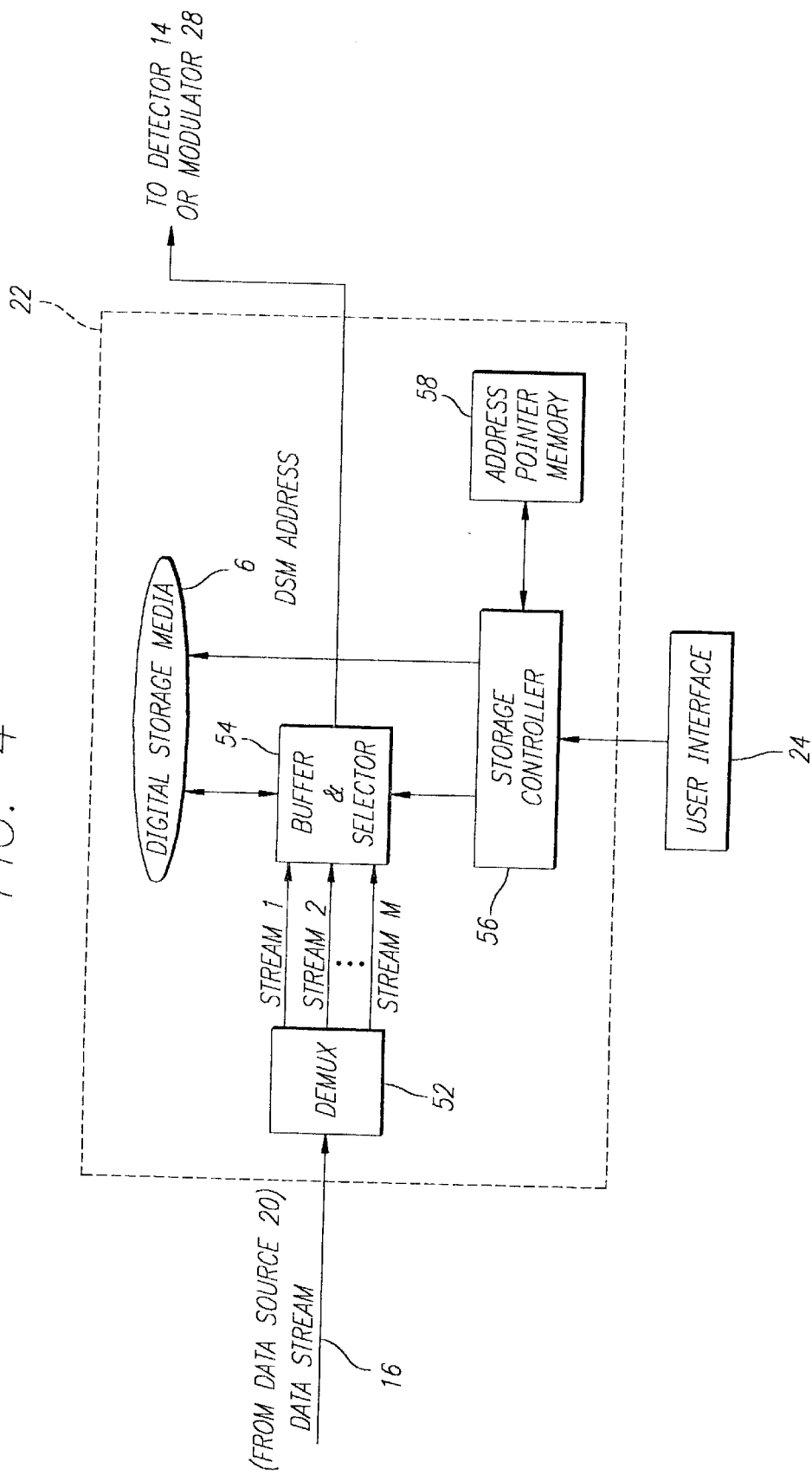
FIG. 4 illustrates a more detailed architecture of a preferred apparatus in accordance with the present invention.

FIG. 4 illustrates a more detailed architecture of apparatus in accordance with a preferred embodiment of the present invention. In FIG. 4, data stream 16 has already passed through demodulation (as in FIG. 2a or 2b), and is now passed to storage and control block 22 for processing. Storage and control block 22 preferable includes demultiplexer 52, which divides data stream 16 into its constituent components, streams 1-M (which were illustrated in detail in FIG. 3). Utilizing user interface 24, a subscriber may enter commands, such as requesting that a movie of interest begin to play, for example. Commands are received and processed via storage controller 56, which directs buffer and selector 54 to select the particular one of the M component streams of data containing the first segment (segment 1) of the desired video program. Digital storage medium ("DSM") 50 and address pointer memory 58 are utilized to support trick mode viewing functions as described below.

Figure 5:
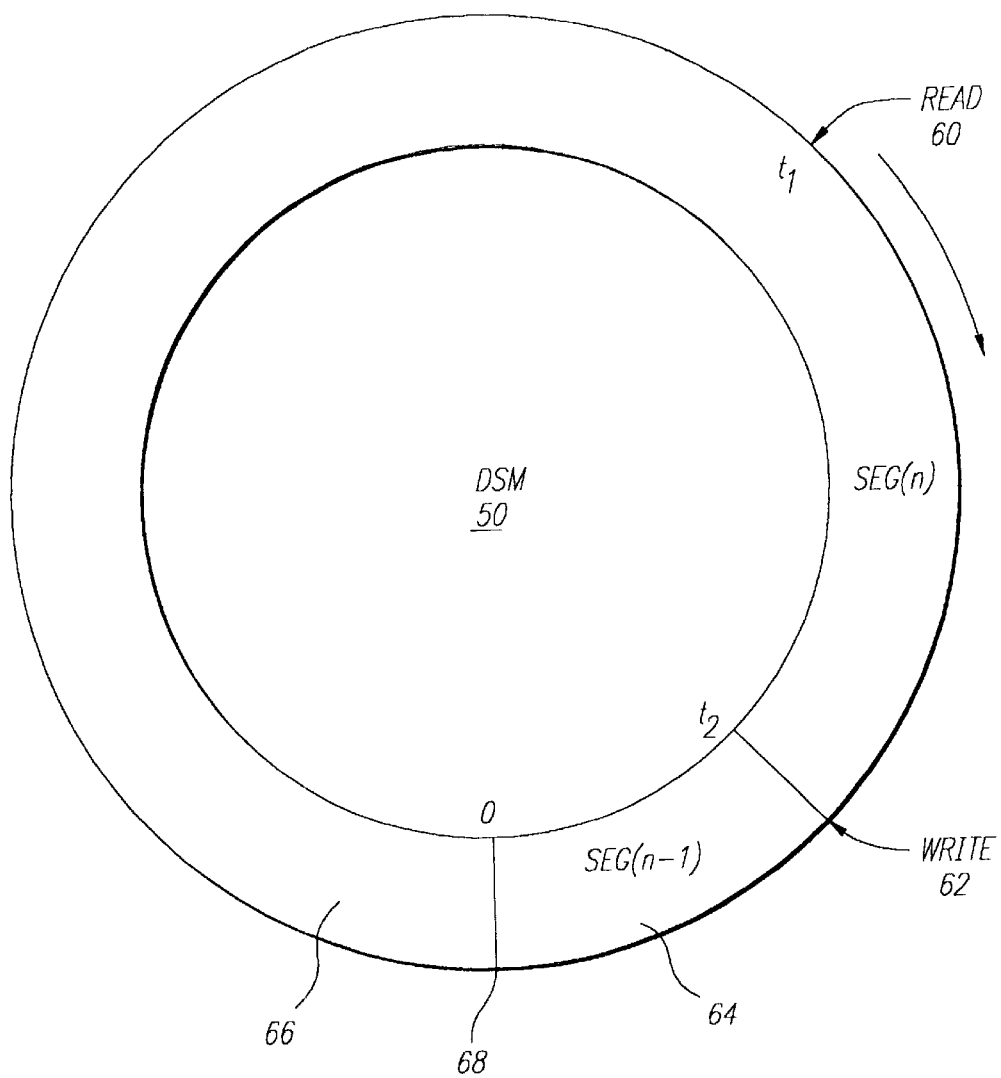
FIG. 5 illustrates the basic architecture of a digital storage medium ("DSM") in accordance with a preferred embodiment of the present invention.

DSM 50 is preferably implemented as random access memory logic or as a hard disk drive, with capacity and response time suitable to satisfy the specifications detailed below. Commercially available hardware is adequate for these purposes. FIG. 5 illustrates the basic architecture of DSM 50. As suggested by that figure, streams of data are stored and then read from DSM 50 in what may be viewed (simplistically and for purposes of explanation) as a circular, clockwise process. Data is sequentially written into DSM 50, with write pointer 62 indicating the current point of insertion and moving in a clockwise direction. At the same time, data is read from DSM 50 in a similarly clockwise fashion, with read pointer 60 indicating the current point being read. These pointers are embodied in address pointer memory 58. At any rate, once data is read from DSM 50, that data is then sent on via buffer & selector 54 to decoder 14 or modulator 28, as shown in FIGS. 4, 2a and 2b. In the example illustrated in FIG. 5, the first t2 seconds worth of segment(n) of the video program has already been written into portion 66 of DSM 50. Write pointer 62 is poised to continue writing in the remainder of segment(n), and will override the remaining portion of segment(n−1) (located in portion 64 of DSM 50) in the process. Read pointer 60 trails behind, at point t1, and is in the middle of reading segment (n). In general, as long as write pointer 62 and read pointer 60 do not cross over each other, but instead continue rotating clockwise around DSM 50 without ever passing each other, the smooth process of receiving video data and then displaying the video data for the subscriber continues.

The challenge of how to implement trick mode functions can now be squarely framed. For example, if read pointer 60 is held in place or slowed down in order to carry out trick mode commands such as pause or slow motion, write pointer 62 will eventually cross over and pass read pointer 60; consequently, when normal play is resumed, necessary program data not yet read by read pointer 60 and not yet displayed to the viewing subscriber will have been permanently overwritten by write pointer 62. Similarly, if read pointer 60 is speeded up in order to carry out trick mode commands such as fast forward, read pointer 60 will eventually catch up with and cross over write pointer 62; at that point, read pointer 60 will be reading out-of-sequence, stale data that write pointer 62 has not yet had an opportunity to update. How then, can trick mode functions be implemented in the continuous fashion to which VCR users are accustomed, without losing program data? The answer lies in making a clever, novel use of the overlapping nature of the video program data streams depicted in FIG. 3. The technique also makes clever use of DSM 50, as will now be described.

Implementing "Pause"

Figure 6A:
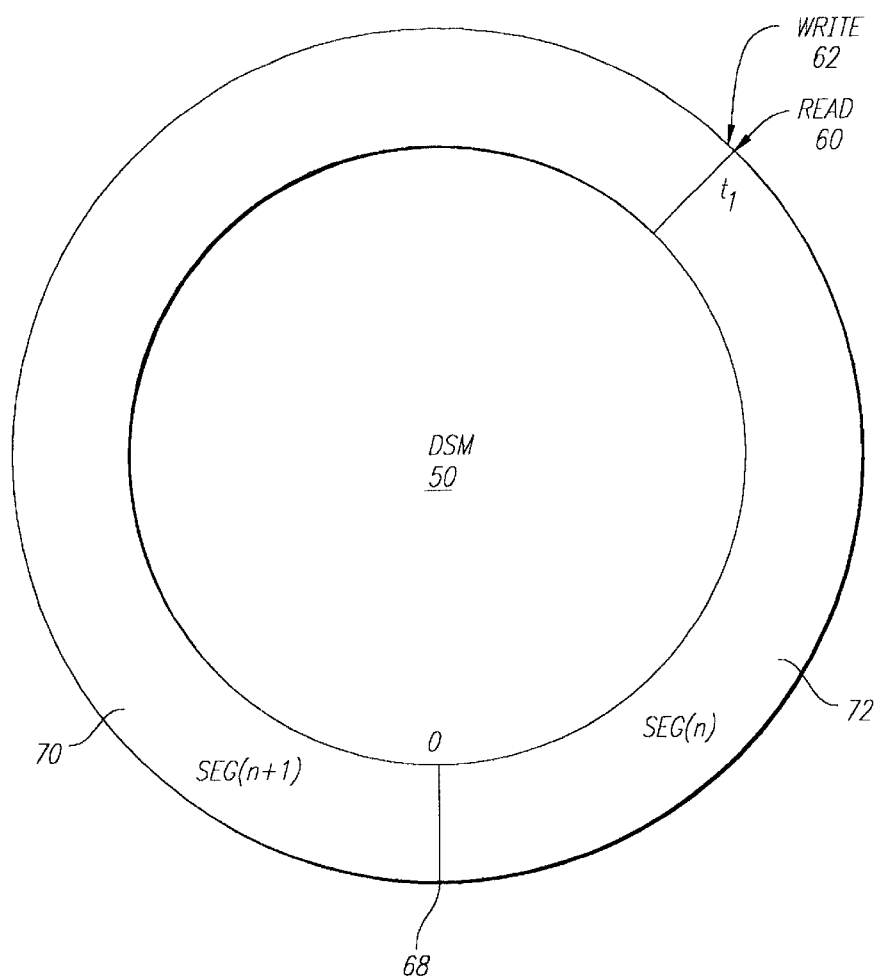
FIG. 6a depicts one state of the DSM during the performance of a "pause" trick mode command.
Figure 6B:
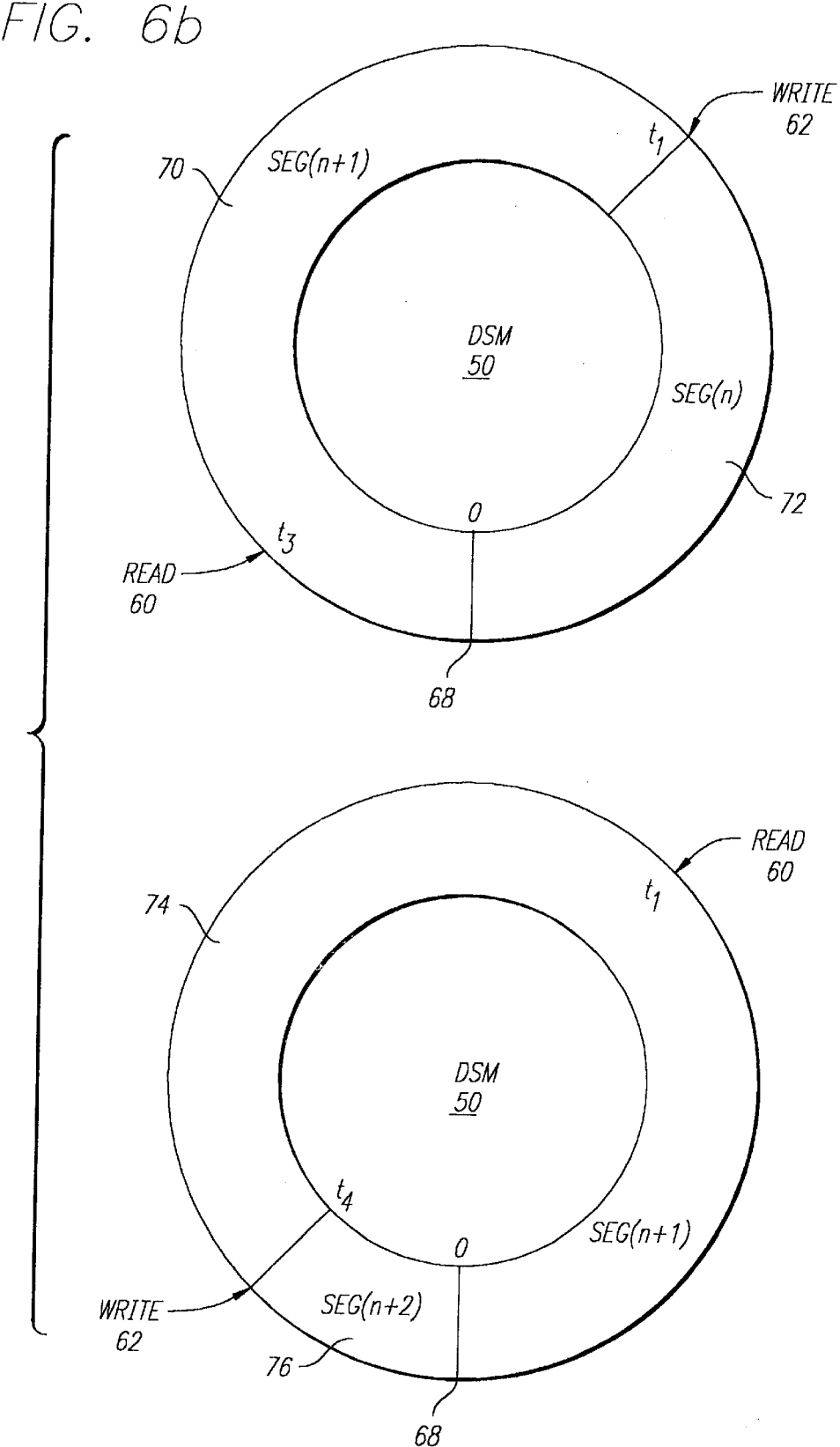
FIG. 6b depicts another state of the DSM during the performance of a "pause" trick mode command.
Figure 7:
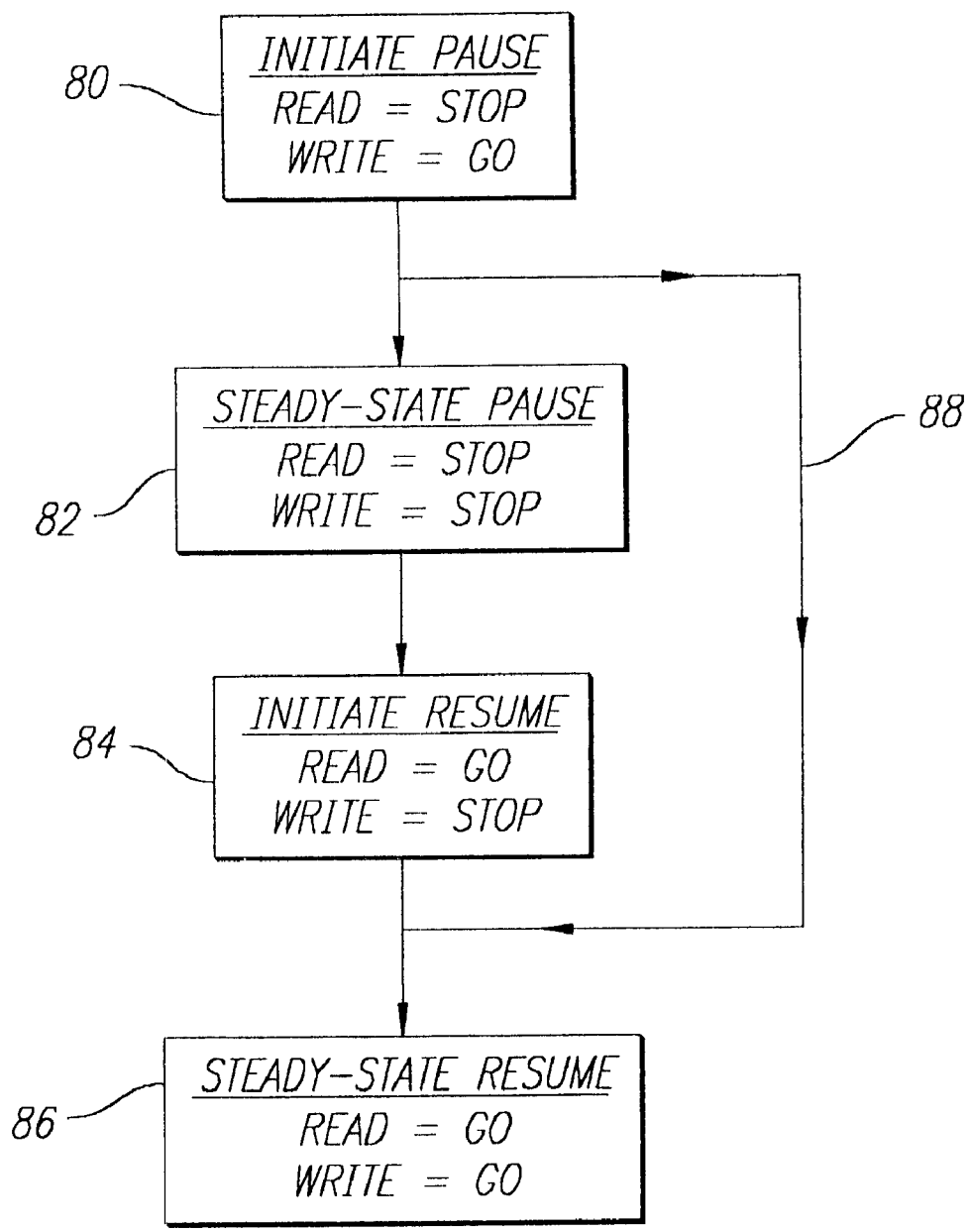
FIG. 7 provides a state transition diagram describing the behavior of the DSM read pointer and the DSM write pointer during the performance of a "pause" trick mode command.

We first describe a preferred technique for implementing the "pause" trick mode function. Assume (without any loss of generality) that FIG. 5 represents the general state of DSM 50 and the read and write pointers at the moment in time that a pause command is issued. FIGS. 6a–b depict various, subsequent states of DSM 50 during implementation of a pause command, while FIG. 7 provides a state transition diagram describing the behavior of read pointer 60 and write pointer 62. At state 80 of FIG. 7 (the "Initiate Pause" state), read pointer 60 is immediately stopped; contents of the display will not be altered while "pause" remains in effect. However, while still in state 80, write pointer 62 continues to write the selected component of data stream 16 into DSM 50. This state continues until write pointer 62 catches up to the position of read pointer 60, namely, for T-(t2-t1) seconds. An illustration of DSM 50 at that point is provided in FIG. 6a. Thus, in the example shown, write pointer 62 has continued to store program data in appropriate sequence in DSM 50—even though read pointer 60 has halted at position t1—corresponding to the remainder of segment(n) and the first t1 seconds worth of segment(n+1).

Note that if the user terminates pause while state 80 is still operative, a transition may be made directly to state 86 ("Steady-State Resume") for resumption of normal play, by simply restarting the motion of read pointer 60 where it left off. This flow is represented by transition line 88 in FIG. 7. If, however, the pause command remains in effect for at least T-(t2-t1) seconds—i.e., pause is still in effect as of the moment when write pointer 62 is about to cross over read pointer 60—then at this juncture a transition is made to state 82 ("Steady-State Pause") of FIG. 7. In state 82, neither read pointer 60 nor write pointer 62 advance any further, and none of the data received as part of data stream 16 during state 82 is stored in DSM 50 or ever displayed on display 18.

In accordance with the present invention, resumption of normal play is possible without any loss of program content and without any noticeable delay. Specifically, when the user terminates the pause by issuing a resume command, a transition is made from state 82 to state 84 ("Initiate Resume") of FIG. 7. In state 84, write pointer 62 remains stopped, but read pointer 60 begins to advance once more at normal speed, reading data that was written to DSM 50 prior to the pause command and/or during state 80. FIG. 6b illustrates DSM 50 and associated pointers during this state. In the example shown in FIG. 6b, read pointer 60 has advanced to a point marked t3, while write pointer 62 remains anchored at t1. Thus, during state 84, the user immediately experiences the resumption of continuous, normal viewing of the video program corresponding to those portions of segment(n) and segment(n+1) (stored in portions 72 and 70 of DSM 50, respectively) that immediately follow the point in the video program at which a pause was initiated.

In order to restart write pointer 62 in a manner that avoids any loss or mis-sequencing of program data, write pointer 62 is restarted at a moment that is precisely an integer multiple of T seconds after the point in time when write pointer 62 was stopped. Write pointer 62 can then pick up precisely where it left off, provided that write pointer 62 is fed data from the particular component stream that is presently transmitting the program segment with which write pointer 62 was occupied before it was stopped.

Now, as shown in FIG. 7, write pointer 62 remains paused over states 82 and 84. The duration of time over which state 82 remains in effect can, in general, be expressed as (p*T)+td, where p is an integer >=0, and where td is a number smaller than T (i.e., a remainder). Therefore, if write pointer 62 is restarted at a moment exactly T-td seconds after state 84 is commenced—in other words, if state 84 lasts exactly T-td seconds—then states 82 and 84 (i.e., the full duration over which write pointer 62 is paused) will jointly last a total of (p+1)*T seconds, which is an integer multiple of T. The (T-td) duration for state 84, like other durations specified herein, can easily be computed in real-time using the logic of storage controller 56.

A transition is then made to state 86 ("Steady-State Resume") of FIG. 7, in which the read and write pointers both resume normal forward motion. However, storage controller 56 now directs buffer & selector 54 to provide data to write pointer 62 from a different one of the M component data streams. In particular, if component stream (n) was in the process of being written to DSM 50 just prior to the pause command, then the contents of component stream(n-(p+1)) should be selected once writing resumes at state 86, because write pointer 62 has been stopped for a total of exactly (p+1)T seconds which corresponds to p+1 segments of program data. Hence, at the moment when state 86 is entered and writing resumes, component stream(n-(p+ 1)) will be transmitting precisely the same program data that was being transmitted by component stream(p) at the moment state 82 was entered and write pointer 62 was originally paused. Thus, pause is implemented in a continuous fashion such that the user perceives no delay either when pausing or resuming and the video program is viewed in correct sequence.

Note that state 84 begins with read pointer 60 and write pointer 62 positioned together, as shown in FIG. 6a; state 84 requires read pointer 60 to advance while write pointer 62 stays fixed; and state 84 lasts for T-td seconds which can be any length of time up to T seconds. It follows that DSM 50 must therefore hold the equivalent of at least one segment of program data, in order to ensure that read pointer 60 does not cross over write pointer 62 during state 84. In this way, the viewing of the video program will proceed continuously and in sequence from the moment "resume" is requested. This translates to a storage capacity requirement for DSM 50 of at least 22.5 megabytes, assuming that program segment length=T=120 seconds (i.e., 2 minutes) and that the average data transmission rate (for each of the M component streams) is 1.5 megabits per second. Assuming T=300 seconds, DSM 50 must hold 55.125 megabytes. Hard disk drives are widely available that satisfy these capacity requirements and also support data access rates of 1.5 megabits per second or better.

Implementing "Slow Motion"

Figure 9:
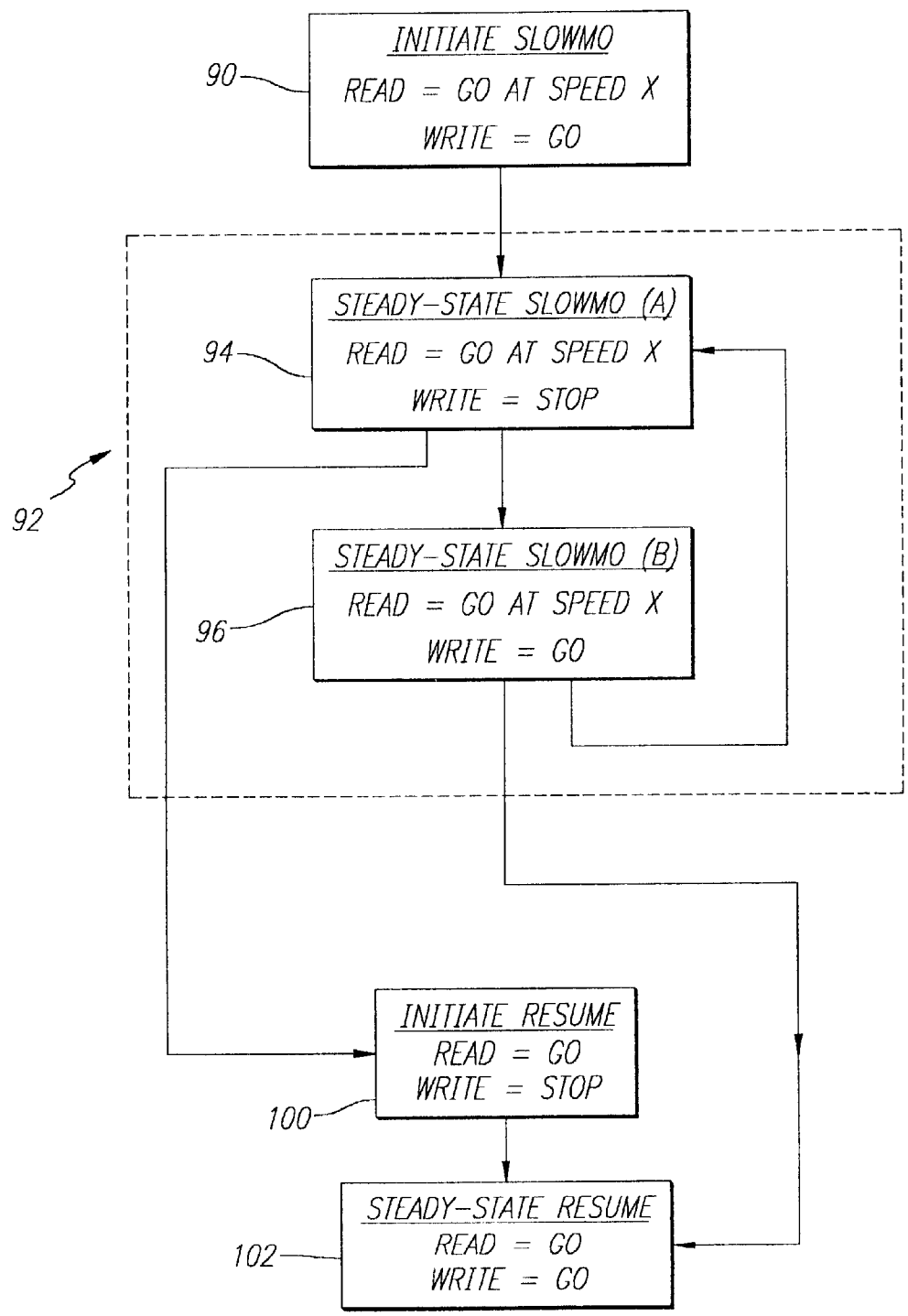
FIG. 9 provides a state transition diagram describing the behavior of the DSM read pointer and the DSM write pointer during the performance of a "slow motion" trick mode command.

FIG. 9 provides a state transition diagram describing the behavior of read pointer 60 and write pointer 62 in accordance with a preferred technique for implementing the "slow motion" trick mode function. When the user issues a slow motion command, performance of the command begins with state 90, "Initiate Slow Motion," wherein read pointer 60 begins moving at a fraction of normal speed (which slows down the display and viewing rate accordingly, as requested), while write pointer 62 continues moving at normal speed. In general, we will refer to the altered speed as X, meaning that reading and viewing occur at X-times the normal speed. Initiate Slow Motion state 90 remains operative until write pointer 62—moving $X^{-1}$ times more quickly than read pointer 60—catches up with read pointer 60. The Initiate state for slow motion is thus analogous to the Initiate state for pause, as described above. Again, FIG. 6a provides an illustration of DSM 50 as of the moment when write pointer 62 catches up with read pointer 60 at t1.

As was true with respect to the pause function, if the user terminates pause while Initiate state 90 is still operative, a transition may be made directly to Steady-State Resume (here, state 102) for resumption of normal play, by simply resuming the motion of read pointer 60 at normal speed. For simplicity, this flow is not explicitly represented in FIG. 9. In that case, write pointer 62 has never been stopped or delayed, nor have the pointers ever crossed over each other, and continuous sequential viewing is therefore assured.

If, however, slow motion remains in effect long enough, then at the moment when write pointer 62 catches up to read pointer 60, as depicted in FIG. 6a, state 92 ("Steady-State Slow Motion") is entered. State 92 actually comprises two further sub-states or modes for Steady-State Slow Motion, namely, state 94 (mode "A") and state 96 (mode "B"). In both modes, read pointer 60 continues advancing at X-times its normal rate. However, in mode A, the initial mode, write pointer 62 stops completely. Mode A remains in effect for exactly T seconds. In mode B, which remains in effect for exactly $T/(X^{-1}-1)$ seconds, write pointer 62 advances at normal speed, i.e., $X^{-1}$ times faster than the slow motion rate of read pointer 60. As soon as mode B is completed, mode A is resumed once again. This cyclical process repeats itself for as long as Steady-State Slow Motion state 92 remains in effect, i.e., until the user requests resumption of normal play; however, during state 96 of each subsequent cycle, buffer & selector 54 feeds write pointer 62 data corresponding to the component stream exactly one segment behind the component stream used during state 96 for the previous cycle.

This steady-state cycle comprising states 94 and 96 is preferably utilized, because it implements slow motion functionality in a manner that ensures continuous viewing of the video program in sequentially correct fashion. The state 94/state 96 cycle achieves this for several reasons. First, because write pointer 62 is always stopped for a period of exactly T seconds during state 94 of each cycle, write pointer 62 can resume writing in state 96 at precisely the correct position within the video program, simply by writing data from the component stream that is exactly one segment offset from the last segment used. Also, because state 96 lasts a total of exactly $T/(X^{-1}-1)$ seconds, write pointer 62 writes a total of $T/(X^{-1}-1)$ seconds worth of data during each cycle; read pointer 60, which advances at slow motion rate throughout states 94 and 96, writes $(T+T/(X^{-1}-1))*X$ seconds worth of data during each cycle, which is algebraically equal to $T/(X^{-1}-1)$. Thus, at the end of each state 94/state 96 cycle, write pointer 62 just catches up once again to read pointer 60, and the pointers never cross over each other. It follows that continuous, sequentially correct viewing of the video program throughout Steady-State Slow Motion state 92 is guaranteed.

Figure 8:
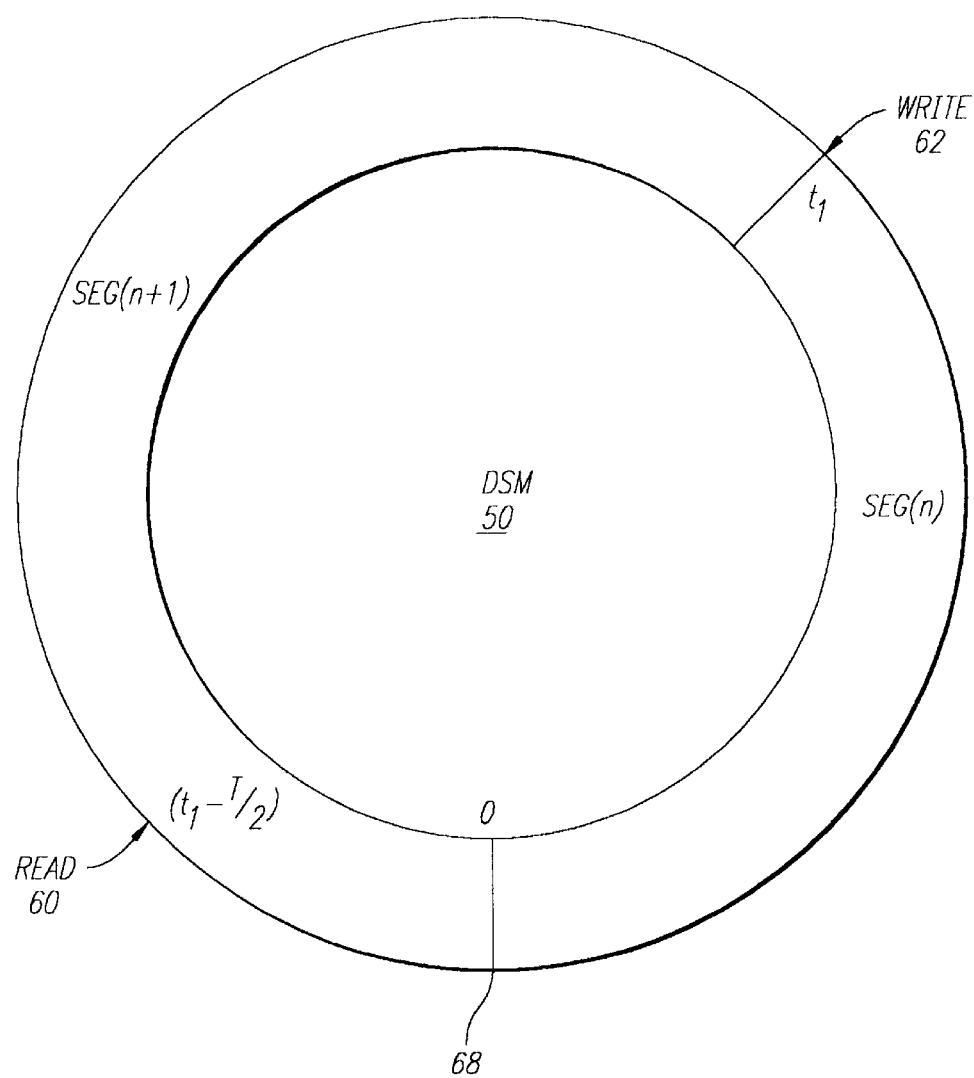
FIG. 8 depicts the DSM during the performance of a "slow motion" trick mode command.

FIG. 8 illustrates DSM 50 during state 94. Write pointer 62 remains stopped after having processed t1 seconds worth of program data in the current segment. Read pointer 60, however, advances at a speed of X-times its normal rate. FIG. 8 assumes slow motion at ½ of normal speed (i.e., X=½), assuming that DSM 50 holds a total of exactly T seconds worth of program data. For this example, FIG. 8 depicts the state of DSM 50 at a moment T seconds after the start of state 94 (i.e., at the very end of state 94): read pointer 60 has advanced half way around DSM 50, and has processed the remainder of segment(n) as well as the first t1−(T/2) seconds worth of program data from segment(n+1).

At some time during state 92, Steady-State Slow Motion, the user will eventually issue a command to resume normal play. The manner in which this is handled depends on whether resume is requested during state 94 (mode A) or state 96 (mode B). As shown in FIG. 9, if resume is requested during state 96 (mode B)—i.e., while write pointer 62 is already advancing at normal speed—then Steady-State Resume (state 102) is directly entered simply by resuming the advance of read pointer 60 at normal speed.

On the other hand, if resume is requested during state 94 (mode A), while write pointer 62 is stopped, then Initiate Resume state 100 must be entered. In state 100, read pointer 60 is immediately restored to normal speed, so that the user experiences continuous forward play in accordance with his or her request. Write pointer 62, however, must continue to wait until the current T second delay period underway for state 94 is completed. At that point, state 102 (Steady-State Resume) is entered, and write pointer 62 resumes normal speed. Of course, when state 102 is entered from state 100, write pointer 62 is fed video data corresponding to the component stream offset exactly one segment behind the component stream used during the last previous state 96, since write pointer 62 has taken an exactly T-second break since then. In this way, program data is written to DSM 50 in correct sequential fashion.

Note that read pointer 60 advances while write pointer 62 is stopped for a total of T seconds during state 94. Therefore, as was true with respect to the pause function, DSM 50 must hold the equivalent of at least one segment (i.e., T seconds worth) of video program data in order to ensure that read pointer 60 does not cross over write pointer 62 during state 94. Once again, commercially available hard disk drives satisfy this capacity requirement and the relevant data access rate requirement. Note also that the one-segment capacity of DSM 50 ensures that read pointer 60 will not cross over write pointer 62 even when read pointer 60 is accelerated to normal speed during state 100. This follows because read pointer 60 and write pointer 62 are synchronized at the beginning of state 94, as discussed earlier, meaning that read pointer 60 must process T seconds worth of data before catching write pointer 62. Because write pointer 62 pauses for exactly T seconds before resuming normal motion—whether or not resume is requested and state 100 is entered during a particular cycle—and because read pointer 60 spends at least a portion of those T seconds at a fraction of full speed, it follows that read pointer 60 will not overtake write pointer 62 before write pointer 62 resumes advancing again at full speed. This ensures that program data is written into and read from DSM 50 in continuous and sequentially correct fashion.

Implementing Fast Forward and Rewind

Fast forward displays the program at a speed X-times faster than normal speed, where X is a positive number greater than 1. Thus, in fast forward mode, read pointer 60 (and hence viewing) advances forward through the video program at the rate of X segments worth of program data per each T-second "cycle" or period. Conversely, rewind displays the program at a negative speed (i.e., in reverse sequence) of a magnitude equal to Y-times normal speed.

Rewind may be fast, e.g., Y may be a number greater than one; or it may be slow motion rewind, where Y is a fraction less than 1. Note that we treat Y as a positive number—i.e., simply a measure of velocity magnitude—in the equations and formulas set forth below, but that Y represents program play at a "negative" speed (i.e., in a reverse direction).

In order to implement fast forward and rewind functionality, a plurality of discrete write processes are utilized to concurrently store data into DSM 50 from multiple program segments—i.e., multiple component streams of data stream 16. The fundamental rule followed in our preferred embodiment is as follows:

TABLE I

At each moment in time, as read pointer 60
moves through the program, store into DSM 50
all currently available program data that is:
(i) up to X segments ahead of read pointer 60's
current position, or (ii) up to Y segments
behind read pointer 60's current position.

In order to support fast forward at maximum speed X and rewind at maximum speed Y, our preferred embodiment therefore provides a total of X+Y logical write pointers (hereinafter denoted w(i)). At a given moment in time, each logical write pointer is associated with a particular segment of program data. In particular, suppose (without any loss of generality) that at time t1, read pointer 60 is reading program data at a point that is d1-seconds into program segment(n); of course, d1<T. Further, at time t1, data stream 16 will be carrying interleaved program data for each and every program segment at a point that is d2 seconds into each segment (again, d2<T), as explained earlier regarding FIG. 3. In order to carry out the fundamental rule for storing data stated above in Table I our preferred embodiment operates as follows:

TABLE II 1. if d1 > d2, then write currently available
   data from each segment (n − Y + 1) through (n + X);
2. if d1 < d2, then write currently available
   data from each segment (n − Y) through (n + X − 1);
3. if d1 = d2, follow either 1 or 2.

Thus, program data from X+Y different segments is always being concurrently stored to DSM 50. In particular, during forward play, program data from the next X segments to be processed is written, along with program data from the most recently read Y segments. Conversely, during reverse play, program data from the next Y segments to be processed is written, along with program data from the most recently read X segments.

The data to be stored is specified by the X+Y logical write pointers. Each such write pointer w(i) is associated, at a given moment, with the particular component stream of data stream 16 corresponding to an associated one of the X+Y program segments being written. Each write pointer w(i) advances forward through its currently assigned program segment at the speed of normal forward play. Because the X+Y logical write pointers operate concurrently, data throughput is X+Y times greater than the rates discussed earlier regarding pause and slow motion trick modes (i.e., for X=1 and Y=0). Some practitioners might elect not to rewrite data that is already stored on DSM 50, which would reduce the throughput requirement somewhat. However, we prefer to simplify logical control of the write pointers by always writing all data specified by the write pointers under the rules of Tables I and II, even if some of that data already exists on DSM 50.

Those of ordinary skill in the art can verify algebraically that if the foregoing rules are followed, and if moreover DSM 50 provides contiguous storage for at least $X+Y^2/(Y+1)$ segments worth of program data, then fast forward and rewind trick mode functionality can generally be supported in principle. A rough, algebraic proof is offered for purposes of edification as an Appendix hereto, and is incorporated herein in its entirety by this reference. Note that although this minimum storage requirement is theoretically attainable, practitioners may deem it preferable to add some additional capacity to DSM 50 in order to accommodate implementation-specific overhead.

The rules set forth in Tables I and II are applied regardless of direction (forward or reverse), and regardless of whether play is fast or slow. If these rules are followed, trick modes can be supported in a sequential and continuous manner.

A Simplified Example

Figure 10A:
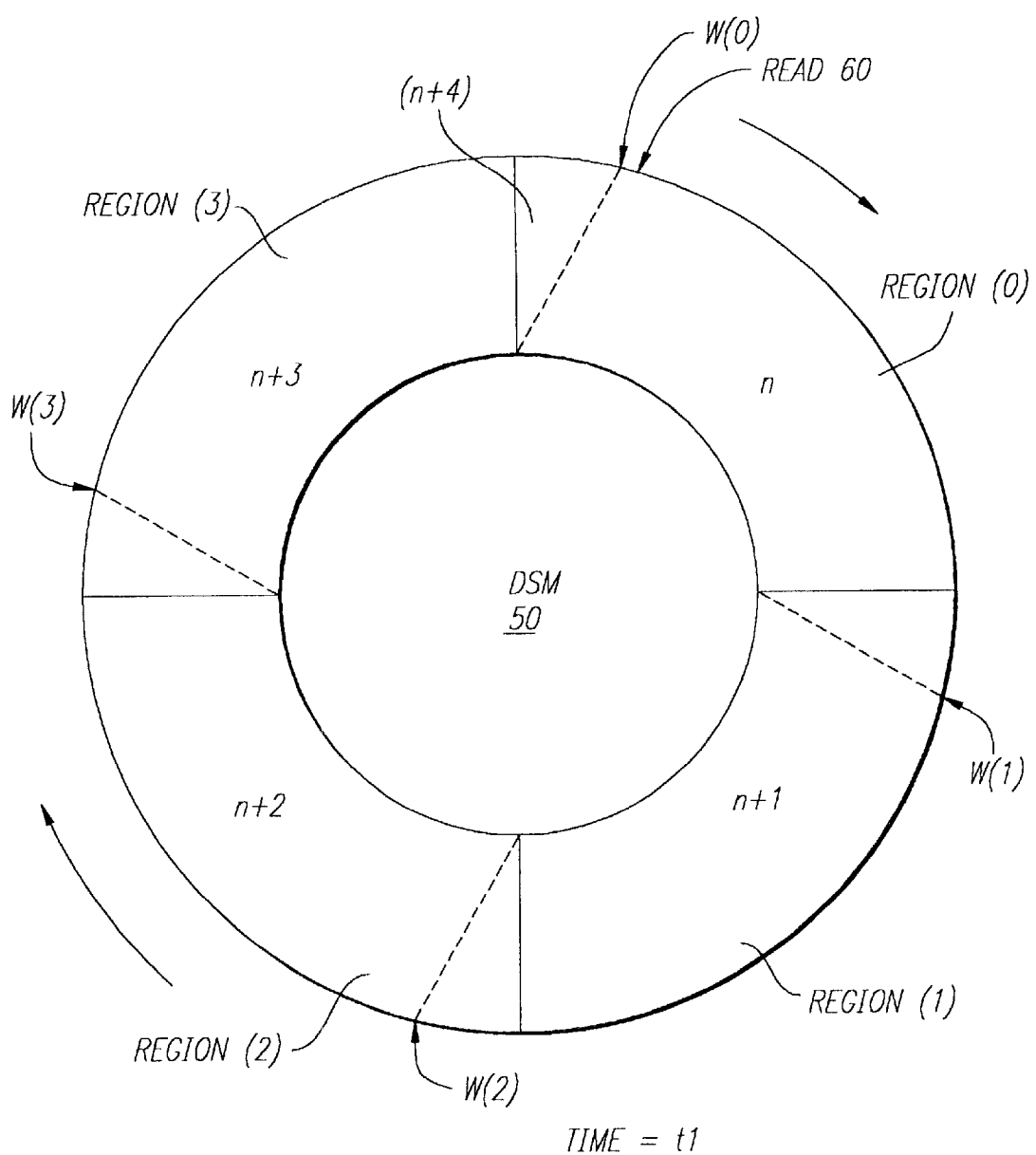
FIG. 10a depicts a simplified, multi-region embodiment for implementing fast forward trick mode.

We will now present an example of a very simplified, theoretical embodiment for supporting fast forward functionality, in order to help readers visualize the foregoing concepts. In the example, fast forward trick mode at a rate of up to four-times normal speed (X=4) is supported, but rewind trick mode is not supported (Y=0). As shown in FIG. 10*a*, DSM 50 therefore provides storage for four segments worth of program data. For purposes of illustration only, we depict DSM 50 as partitioned into four (i.e., X) separate regions, labeled region(0) through region (3) in the figure. Each region holds a single segment (i.e., T seconds) worth of program data. As will be explained below, such partitioning is not necessary in practice; however, it makes the following discussion somewhat easier to visualize and follow.

The example of FIG. 10*a* assumes that, initially, region(0) contains all data for program segment(n), and more generally region(i) contains all of the data for program segment (n+i). FIG. 10*a* depicts the state of the pointers and DSM 50 a few brief moments after this posited initial state, at time t1. At time t1, read pointer 60 has just begun reading data for program segment(n) from region(0) of DSM 50. Assuming that read pointer 60 is operating in fast-forward mode, the write pointers (which always travel at normal speed) already lag a bit behind, each within its associated segment. Following the rules set forth earlier in Table I and Table II, the write pointers are storing currently transmitted program data for segment(n+1) through segment(n+4); thus, w(0) has been storing data for segment(n+4), while the other pointers w(i) have each been rewriting existing data for associated segment(n+i).

Figure 10B:
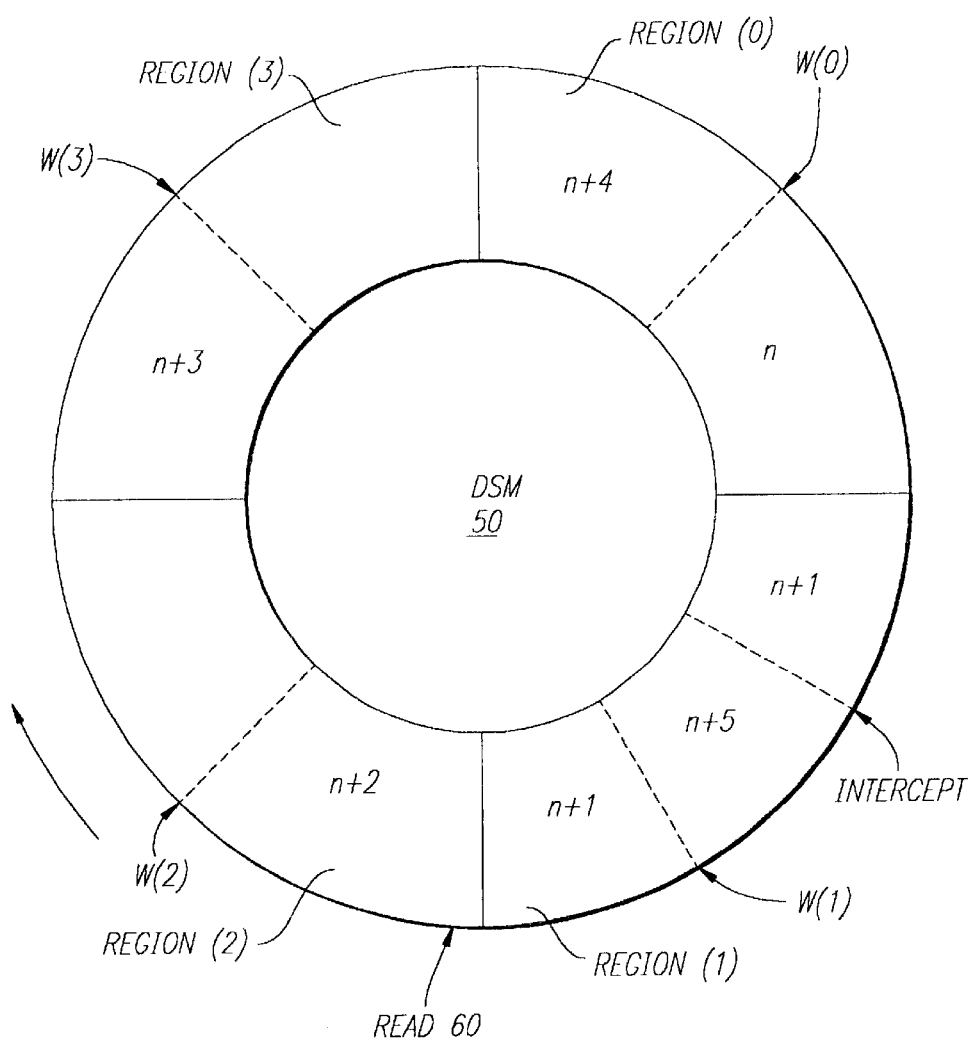
FIG. 10b depicts another aspect of the simplified example for implementing fast forward trick mode.

FIG. 10*b* shows the state of the pointers and of DSM 50 exactly T/2 seconds later, assuming that read pointer 60 advances at maximum speed all the while. At time t1+T/2, read pointer 60 is half-way through its current cycle, and has just begun reading data for program segment(n+2). Following the rules set out in Tables I and II, the write pointers should be writing currently available data for segment(n+2) through segment(n+5), and so they are. W(0) has continued writing new data for segment(n+4) at normal speed, and is half-way through that segment. Pointers w(2) and w(3) have continued rewriting segment(n+2) and segment(n+3), respectively. Pointer w(1) has been writing program data for segment(n+5) ever since read pointer 60 caught up with w(1) at the intercept point of FIG. 10*b*.

Thus, for the example of FIGS. 10a and 10b, if write pointer w(i) has been writing program data for segment(n+i), then it continues to do so until read pointer 60 overtakes w(i), and reaches data within segment(n+i) that is beyond the current position of w(i). After that intercept point, w(i) switches exactly X component streams forward (in accordance with FIG. 3), and stores data from program segment (n+i+X). With this technique, it is easy to see that program viewing will proceed in a continuous and sequential manner, no matter what forward speed a user requests for viewing (up to a speed of X-times normal). That is simply because any pointer w(i) that is intercepted will always have at least T seconds—i.e., just enough time to completely store data for the next segment to be read in the region(i)—before read pointer 60 crosses over w(i) again, even if read pointer 60 travels at maximum speed X. Of course, if a user slows down viewing speed during a cycle, one or more of the write pointers will finish storing their new segment before being intercepted by read pointer 60 on the next cycle. In that case, those write pointers simply rewrite existing segment data until the moment of interception. Thus, the utility of (i) the overlapping component data streams of FIG. 3, and (ii) the storage capacity of DSM 50 is clear.

The Preferred Embodiment

In the simplified example above, a theoretical architecture was used in which each individual write pointer was responsible for writing to a corresponding region of DSM 50. This multi-region approach was used to simplify and clarify our discussion. In practice, however, our preferred embodiment utilizes a single region architecture in which all of the active logical write pointers write data in an interleaved fashion through a single, physical write pointer at a rotating point of insertion into DSM 50. Read pointer 60 has random access capability, so that it can read and process the interleaved data in a non-sequential manner as required to restore actual program sequence. The data interleaving may be performed in any one of numerous convenient ways as will be appreciated by those of skill in the art, such as by interleaving on a bit-by-bit, byte-by-byte, or packet-by-packet basis, where a "packet" may be arbitrarily defined by a practitioner for particular applications or data compression schemes.

Figure 11:
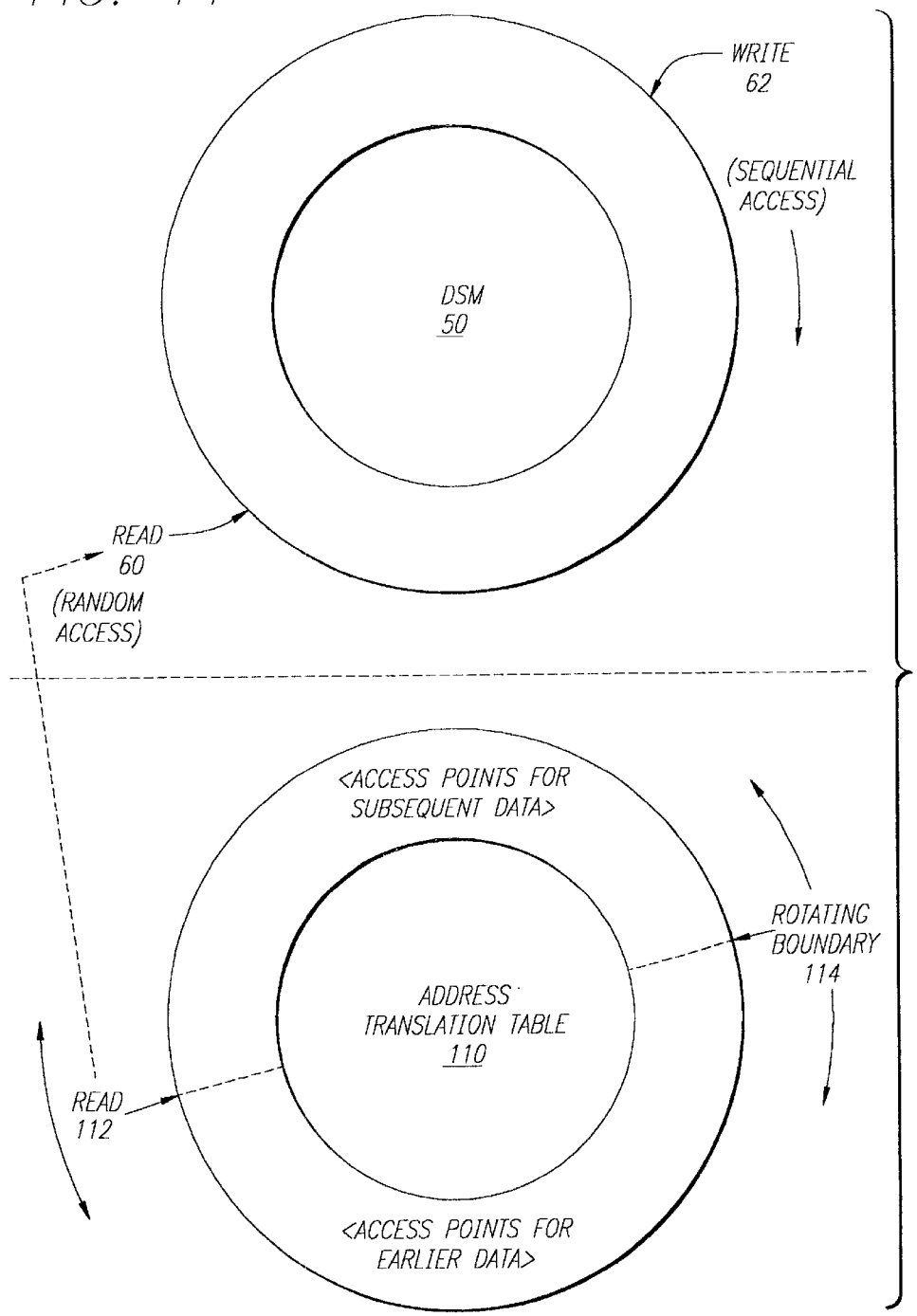
FIG. 11 depicts a preferred embodiment for implementing fast forward and rewind trick modes.

FIG. 11 illustrates a preferred implementation embodying a single region architecture, and capable of supporting fast forward play at up to X-times normal speed, and rewind at Y-times normal speed. As noted previously, all writing occurs at the current, single point of insertion on DSM 50 marked by write pointer 62; data received concurrently from multiple write pointers is interleaved before being written to DSM 50. Upon reaching the physical boundary of the storage device, write pointer 62 wraps around to the beginning, and writing continues in this circular manner.

While writing is performed sequentially, reading is performed by randomly accessing DSM 50. Preferably, an address translation table is therefore used to identify the actual DSM 50 address of the current data to be read. This translation function is easily implemented using a small and inexpensive random access memory device, shown in FIG. 11 as Address Translation Table 110.

As shown in FIG. 11, Address Translation Table 110 can be organized as a circular buffer, much like DSM 50. Read pointer 112 rotates clockwise during forward play, and counterclockwise during rewind play, in synchronization with the viewing speed requested by the user. Boundary 114 between leading and trailing "access points" (i.e., addresses into DSM 50) also rotates so as to maintain a fixed relationship with read pointer 112. The access point or address read by read pointer 112 is used in real-time to direct read pointer 60 to read and process the appropriate data within DSM 50. Similarly, as new data is written into DSM 50 by write pointer 62, corresponding access points for the new data are appropriately updated in Address Translation Table 110.

The size of Address Translation Table 110 must be sufficient to contain an address within DSM 50 for each possible access point to program data, where the number of discrete access points provided may depend on the video compression algorithm being used. For example, MPEG video compression distinguishes between three types of image frames: I-Frames, P-Frames, and B-Frames. The latter two frame types both use temporal prediction, and contain information that is indicative of the changes that have occurred relative to image frames that should already exist in the decoders memory. When the compressed bit stream is entered at random, the decoder will have no knowledge of these prerequisite frames, and therefore the information contained in the P- and B-Frames will not be useful. On the other hand, I-Frames can be successfully reconstructed by decoders which have no knowledge of information that should have been received during previous frames. Therefore, it is only necessary to store the addresses of the I-Frames in Address Translation Table 110, since this table only needs to be accessed when the bit stream is to be reconstructed in non-sequential order. For instance, rewind play at any speed would constitute non-sequential order and in this case only the I-Frames are useful. These frames can be repeated if necessary to obtain the desired display rate. Non-sequential access may also be required when implementing fast forward trick modes since it is reasonable to assume that the decompression and display hardware cannot reconstruct and display the entire sequence of frames at a rate greater than the normal playback speed. Therefore, in this case, certain frames would be omitted. Generally, both the P- and B-Frame types would be discarded, although it is possible to preserve the P-Frames at certain limited fast-forward speeds. However, even in this case it may not be necessary to record the location of the P-Frames in Address Translation Table 110, since at these playback speeds it may be possible to retrieve all of the frames from DSM 50 and then discard those which will not be displayed. As with rewind playback, those frames which are not discarded can be repeated if necessary to achieve the desired display rate.

In this example, the number of access points which would need to be stored in Address Translation Table 110 would not exceed the number of I-Frames contained in DSM 50. In a typical application, I-Frames may be transmitted at a rate of 2 per second. Thus, if the duration of each video segment is 5 minutes (i.e., 300 seconds), for example, and we provide two access points each second, the number of access points for each video program segment would be 600. As explained earlier, DSM 50 stores at least $X+Y^2/(Y+1)$ segments worth of data; it therefore follows that if, for example, X=4 and Y=2, then a total of at least 3200 access points are stored: 2400 access points "ahead" of read pointer 112, and 800 access points "behind" read pointer 112, separated by boundary 114.

DSM 50 and Address Translation Table 110 are both initialized when the viewer first tunes in to a program. Data then begins to be stored starting at the beginning of DSM 50 by enabling those write pointers which are immediately ahead and immediately behind the starting point. At the same time, the addresses within DSM 50 for the data being stored are entered into Address Translation Table 110 as discrete access points. The access points are arranged within Address Translation Table 110 such that read pointer 112 can read and process them in sequential fashion. The direction and speed of read pointer 112 are directly determined by the viewing speed requested by the user.

During the first interval of play, corresponding to the duration of one program segment (i.e., T seconds), some restrictions on the use of trick mode functions are preferably imposed. These restrictions are easily implemented by detecting whether data identified by an access pointer actually exists on DSM 50. Should such non-existent data be detected, the current image is preferably frozen until the required data becomes available or until playback mode is changed by the user so as to obviate the need for the unavailable data. For example, if fast forward play is attempted immediately after initialization, the user is effectively attempting to advance ahead of write pointer 62, and responsive data will not yet be available in DSM 50. Therefore, forward play is generally limited to a maximum of normal speed until after the first segment interval has transpired, so as to ensure that read pointer 60 does not overtake write pointer 62. Note that MPEG decoders can be made to automatically freeze the current image if the next frame is not received in time to be displayed.

One method of detecting whether valid data exists on DSM 50 is to create a virtual address space that is twice the size of DSM 50. This can be done by appending an additional bit to the storage device address that is recorded in Address Translation Table 110. It would serve as the most significant bit ("MSB") and would be ignored when DSM 50 is actually addressed. However, if the difference between a virtual reading address obtained from the table and the current virtual writing address exceeded the size of the storage device, then it could be assumed that the data does not exist. This could result if DSM 50 were too small to accommodate the number of segments that are stored, or it could result during initialization. Detection during initialization is achieved if the entire address translation table is initialized with virtual addresses of 0, and the current virtual address that is used for writing is initialized by combining an MSB of 1 with a DSM 50 address of 0. In this way, new entries inserted into the address translation table would contain an MSB of 1, and would therefore be differentiated from those table entries which have not yet been set.

The single region approach of our preferred embodiment offers a number of advantages. The architecture is easily adapted to diverse hardware and software implementations. Moreover, because the preferred single region approach writes all data sequentially at a single, rotating point of insertion, rather than alternating among various, non-sequential insertion points for multiple regions, relatively high data throughput can be accommodated. In particular, currently available hard disks can readily support the resulting data throughput requirements, assuming that applicable data compression ratios, segment durations, and values of X and Y all fall within typical ranges.

Handling Jumps

A forward speed of X and a reverse speed of Y are the maximum speeds that can be sustained continuously in the illustrations discussed. Preferably, however, a user may also choose to jump to arbitrary points in the program. If the user chooses to jump up to X segments forward or $Y^2/(Y+1)$ segments backwards, then read pointer 112 is immediately reset to the appropriate access point. Some temporary trick mode restrictions are still needed, however. For example, if the user chose to jump forward by exactly 1 segment (where X is greater than 1), then read pointer 112 would be advanced forward by the number of access points corresponding to 1 segment (600 in the previous example). At the same time, boundary 114 between leading and trailing access points would also advance forward by 1 segment worth of access points. Each access point that boundary 114 crosses must be initialized to a suitable value, i.e., a value less than the current virtual writing address by an amount at least as great as the total size of DSM 50. In this way, the system will detect that addresses stored in this portion of Address Translation Table 110 are invalid should they be retrieved before valid addresses can be stored. Such invalidity could occur, for example, during the first segment interval after the jump described, if the user chose fast forward at more than X−1 times normal playback speed for a sustained period of time. If a user chooses to jump forward by more than X segments or backwards by more than $Y^2/(Y+1)$ segments, then the requested jump would have to be "rounded off" to the point within the program being written by the closest write pointer. In addition, temporary restrictions on the use of trick modes must again be imposed, as at initialization.

Other Variations

Other embodiments and modifications within the spirit of the present invention will occur to those of ordinary skill in the art in view of these teachings, including further variations on, and alternatives to, the illustrative hardware and algorithms that have been disclosed herein. Such embodiments and variations remain within the scope of the present invention, which is limited only by the following claims.

We claim:

1. A method for presenting a video program to a plurality of users, wherein each of the users is allowed to select a desired presentation speed, said method comprising the following steps:

receiving a repeatedly transmitted number of interleaved temporal segments of program data at a predetermined rate from a central data source;

specifying, by one of the users, the desired speed;

selecting one or more of the temporal segments in response to the specified desired speed;

writing the selected temporal segment(s) into a local storage medium of the one of the users; and while continuing to receive said program data from said central data source, reading and presenting the program data from the local storage medium continuously and at the desired speed, without altering the predetermined rate said program data is delivered from the central data source.

2. The method of claim 1, wherein the repeatedly transmitted number of interleaved temporal segments of program data is repeatedly transmitted from the central data source at a plurality of predetermined intervals.

3. The method of claim 1, wherein the step of writing the selected temporal segment(s) into a local storage medium is controlled by a plurality of write pointers, each one of the write pointers being associated with a different one of the temporal segments.

4. The method of claim 1, wherein a maximum sustainable forward speed and a maximum sustainable reverse speed are allowed, and wherein the step of selecting one or more of the temporal segments for storage includes evaluating what program data is currently being read from the local storage medium, and evaluating the maximum sustainable forward speed and maximum sustainable reverse speed.

5. The method of claim 1, wherein the desired speed is zero.

6. The method of claim 1, wherein the desired speed is negative.

7. The method of claim 1, wherein the desired speed is greater than a normal viewing speed.

8. The method of claim 1, wherein the desired speed is equal to a fraction of a normal viewing speed.

9. The method of claim 1, wherein the step of reading the program data from the local storage medium includes the step of addressing, via an address table, the program data stored on the local storage medium.

10. The method of claim 1, wherein the number of interleaved temporal segments of program data comprises an interleaved data stream that is formed by partitioning the video program into an ordered sequence of a plurality of n segments with each of the n segments being organized as an ordered sequence of elements and then interleaving the elements to produce the interleaved data stream such that adjacent elements of the interleaved data stream originate from a different one of the n segments.

11. An apparatus for presenting a video program to a user at a desired speed selected by the user, said apparatus comprising:

means for receiving a repeatedly transmitted number of interleaved temporal segments of program data at a predetermined rate from a central data source;

a user interface device for specifying the desired speed;

a selector configured to select one or more of the temporal segments in response to the specified desired speed;

a local storage medium;

means for writing the selected temporal segment(s) into the local storage medium of the user; and means for, while continuing to receive said distributed program data from said central data source, reading and presenting the program data from the local storage medium continuously and at the desired speed, without altering the predetermined rate said program data is delivered from the central data source.

12. The apparatus of claim 11, wherein the repeatedly transmitted number of interleaved temporal segments of program data is repeatedly transmitted from the central data source at a plurality of predetermined intervals.

13. The apparatus of claim 11, wherein the means for writing the selected temporal segment(s) to a local storage medium include a plurality of write pointers.

14. The apparatus of claim 11, wherein a maximum sustainable forward speed and a maximum sustainable reverse speed are allowed, and wherein the means for selecting one or more of the temporal segments for storage include means for evaluating what program data is currently being read from the local storage medium, and for evaluating the maximum sustainable forward speed and maximum sustainable reverse speed.

15. The apparatus of claim 11, the apparatus being operable to specify a desired speed of zero.

16. The apparatus of claim 11, the apparatus being operable to specify a negative desired speed.

17. The apparatus of claim 11, the apparatus being operable to specify a desired speed greater than a normal viewing speed.

18. The apparatus of claim 11, the apparatus being operable to specify a desired speed equal to a fraction of a normal viewing speed.

19. The apparatus of claim 11, further including a table for addressing the program data stored on the local storage medium.

20. The apparatus of claim 11, wherein the number of interleaved temporal segments of program data comprises an interleaved data stream that is formed by partitioning the video program into an ordered sequence of a plurality of n segments with each of the n segments being organized as an ordered sequence of elements and then interleaving the elements to produce the interleaved data stream such that adjacent elements of the interleaved data stream originate from a different one of the n segments.

* * * * *